(12) United States Patent
Crossley et al.

(10) Patent No.: US 10,240,290 B2
(45) Date of Patent: Mar. 26, 2019

(54) METHOD OF PRODUCING CELLULOSE NANOFIBRILS

(71) Applicant: GL&V Luxembourg S.à.r.l., Munsbach (LU)

(72) Inventors: Bruce Crossley, Pittsfield, MA (US); Marc Gerrer, Merrimack, NH (US)

(73) Assignee: GL&V USA, Inc., Nashua, NH (US)

( * ) Notice: Subject to any disclaimer, the term of this patent is extended or adjusted under 35 U.S.C. 154(b) by 0 days.

(21) Appl. No.: 15/578,786

(22) PCT Filed: Jun. 3, 2016

(86) PCT No.: PCT/US2016/035806
§ 371 (c)(1),
(2) Date: Dec. 1, 2017

(87) PCT Pub. No.: WO2016/196983
PCT Pub. Date: Dec. 8, 2016

(65) Prior Publication Data
US 2018/0135246 A1    May 17, 2018

Related U.S. Application Data

(60) Provisional application No. 62/170,953, filed on Jun. 4, 2015.

(51) Int. Cl.
| | | |
|---|---|---|
| *C08L 1/02* | (2006.01) | |
| *D21D 5/04* | (2006.01) | |
| *D21H 11/18* | (2006.01) | |
| *C08B 15/08* | (2006.01) | |
| *D21C 9/00* | (2006.01) | |

(Continued)

(52) U.S. Cl.
CPC ............. *D21D 5/04* (2013.01); *C08B 15/08* (2013.01); *C08L 1/02* (2013.01); *D21C 9/007* (2013.01); *D21D 1/00* (2013.01); *D21D 99/00* (2013.01); *D21H 11/18* (2013.01)

(58) Field of Classification Search
CPC ........ D21H 11/18; D21C 9/001; D21C 9/007; D21D 5/00; D21D 5/04; D21D 1/00; D21D 99/00; C08B 15/08; C08L 1/02
See application file for complete search history.

(56) References Cited

U.S. PATENT DOCUMENTS 8,201,990 B2 * 6/2012 Sykora .................. B01F 3/1221
241/297
8,752,776 B2 * 6/2014 Dean ......................... D21B 1/12
241/21

(Continued)

FOREIGN PATENT DOCUMENTS

WO    WO-2014070452 A1 *  5/2014  ............. D21C 9/001
WO         2014111854 A1    7/2014
(Continued)

*Primary Examiner* — Jose A Fortuna
(74) *Attorney, Agent, or Firm* — James Earl Lowe, Jr.

(57) ABSTRACT

A cellulose nanofibrils production method comprising the steps of: identifying a desired level of cellulose nanofibrils pulp purity, partially refining pulp to produce a cellulose nanofibrils pulp purity between 5% and 15% less than the desired desired purity, and then separating out the cellulose nanofibrils from the longer fibers to produce the desired level of cellulose nanofibrils pulp purity.

4 Claims, 4 Drawing Sheets

(51) Int. Cl.
*D21D 1/00* (2006.01)
*D21D 99/00* (2006.01)

(56) References Cited

U.S. PATENT DOCUMENTS

| | | | | |
|---|---|---|---|---|
| 8,906,198 B2* | 12/2014 | Sabourin | ............... | D21C 9/001 162/187 |
| 9,051,684 B2* | 6/2015 | Hua | ............... | D21D 1/20 |
| 9,926,668 B2* | 3/2018 | Axrup | ............... | C08K 3/26 |
| 2011/0277947 A1 | 11/2011 | Hua et al. | | |
| 2012/0160433 A1* | 6/2012 | Vehvilainen | ............... | D21C 9/007 162/24 |
| 2013/0017394 A1* | 1/2013 | Hua | ............... | D21D 1/20 428/401 |
| 2014/0124150 A1* | 5/2014 | Sabourin | ............... | D21C 9/001 162/9 |
| 2014/0284407 A1* | 9/2014 | Tamper | ............... | D21D 1/36 241/21 |
| 2015/0090412 A1* | 4/2015 | Sabourin | ............... | D21C 9/001 162/9 |
| 2015/0337493 A1* | 11/2015 | Heiskanen | ............... | C08B 15/08 162/9 |
| 2016/0060815 A1* | 3/2016 | Heiskanen | ............... | D21H 11/18 162/9 |
| 2016/0289893 A1* | 10/2016 | Martin | ............... | B82Y 40/00 |
| 2017/0073893 A1* | 3/2017 | Bilodeau | ............... | D21D 1/30 |
| 2017/0121908 A1* | 5/2017 | Holtan | ............... | D21H 11/18 |
| 2017/0166662 A1* | 6/2017 | Alonso | ............... | B01D 21/0012 |
| 2017/0183555 A1* | 6/2017 | Lillandt | ............... | C09K 8/10 |
| 2017/0306057 A1* | 10/2017 | Windebank | ............... | C08B 16/00 |
| 2017/0306562 A1* | 10/2017 | Phipps | ............... | D21H 11/18 |
| 2018/0073194 A1* | 3/2018 | Hua | ............... | D21H 11/02 |
| 2018/0237990 A1* | 8/2018 | Heiskanen | ............... | D21D 1/20 |
| 2018/0245286 A1* | 8/2018 | Heiskanen | ............... | D21H 11/18 |

FOREIGN PATENT DOCUMENTS

WO 2014174152 A1 10/2014
WO WO-2016196983 A1 * 12/2016 ............ C08B 15/08

* cited by examiner

| PURIFIER FEED CONSISTENCY | INLET FINES | ACCEPT FINES | INCREASE IN FINES | GROSS ENERGY REDUCTION (kWh/t) | GROSS ENERGY SAVINGS |
|---|---|---|---|---|---|
| (%) | (%) | (%) | (%) | (kWh/t) | (%) |
| 1.04 | 66.3 | 80.5 | 14.2 | 513.46 | 24.1% |
| 0.97 | 76.6 | 86.7 | 10.1 | 543.54 | 20.5% |
| 1.00 | 81.3 | 90.5 | 9.2 | 673.16 | 22.2% |
| 1.05 | 85.9 | 92.4 | 6.5 | 613.03 | 18.8% |

METHOD OF PRODUCING CELLULOSE NANOFIBRILS

BACKGROUND

There are some applications of Nano-Fibrillated Cellulose (NFC) that require greater purity or less long fiber than others. Conventional production of this purer product requires longer refining times to reach that condition. NFC, also commonly referred to as Microfibrillated Cellulose (MFC), Micro-Nano Fibrillated Cellulose (MNFC), Cellulose Nanomaterials, etc., are small cellulose fibers on the order of about 0.25 to 0.05 mm in length.

The knotter uses a barrier, or screen cylinder, with perforations in the 8 to 12 mm diameter range being most common, although perforations as small as 6 mm or as large as 16 have been used. The most common size is 9.5 mm diameter. Pulp stock passes through this screen cylinder, while the larger pieces of uncooked wood chips cannot pass through. Flows on the inlet side of the screen cylinder carry the knots to one end of the screen cylinder, from which they are discharged as "rejects".

A conventional process for producing Cellulose Nanofibrils (CNF) pulp uses refiners equipped with various differing refiner plates and expends significant amounts of refining energy applied to conventional hardwood or softwood pulp. This refining process is usually a recirculation system whereby the refiner discharge is directed back into an agitated feed tank to be fed through the refiner numerous times. Energy is applied through this process to shorten the fiber, increase fibrillation, and increase CNF content of the pulp. During this process the refiner plate gaps are reduced significantly in order to maintain the desired level of energy application and CNF development. This constant application of energy and shortening of the fiber results in a decreasing ability of the refiner plates to capture the fiber on the bar edges resulting in reduced refining efficiency. This then results in potentially significant plate wear along with the additional power applied over time.

The conventional process, when run to the point of very high fines concentration such as but not limited to >85%, uses increasingly greater power as the CNF level increases. Additionally, there is always present some volume of longer fiber which can be detrimental in some applications of this product.

The conventional method of producing Cellulose Nanofibrils (CNF) is through a multistage refining or grinding process, which starts with any number of various pulp types like but not limited to bleached softwood Kraft pulp. The pulp supply can be bleached or unbleached, softwood, hardwood, virgin or recycled fiber, or other plant fiber. The refining process is carried out in a way that recirculates 42 all or a portion of the pulp supply through the refiner while applying energy to the fiber to result in an ever increasing fines level in the pulp. The process could be either continuous or batch but a typical continuous process is very equipment intensive. As the refining energy is applied, the CNF level increases but at a decreasing rate as the fiber is shortened and CNF increases. This process can be carried out in several stages; possibly each stage using a different refiner plate pattern than the previous.

As the refining process continues, the efficiency of energy transfer to the fiber decreases as the decreasing fiber length and increasing CNF level takes place. Thus, more and more energy is expended to further increase the CNF content to a desired target. A typical energy input to produce CNF at a 90% fines level is 2500-3500 kWh/ton. Some of the targeted CNF levels for certain applications may approach or exceed 95% as measured by an optical fiber length analyzer or other similar device. An alternative measurement method could be Water Retention Values with, but not limited to, targets in the 5.0 to 10.0 range. Significant amounts of energy may be expended to reach those target levels.

SUMMARY

Disclosed is a cellulose nanofibrils production method comprising the steps of: identifying a desired level of cellulose nanofibrils pulp purity, partially refining pulp to produce a cellulose nanofibrils pulp purity between 5% and 20% less than the desired desired purity, and then separating out the cellulose nanofibrils from the longer fibers to produce the desired level of cellulose nanofibrils pulp purity. Purity being defined by a number of fibers under a desired length of fiber compared to the total number of fibers.

This disclosure addresses the level of energy required and plate wear that occurs toward the end of a refining process by stopping the refining process at a lower CNF level and processing the resulting pulp in a device that removes the longer fiber, thereby resulting in a pulp with the desired CNF characteristics with little or no long fiber present in the product. The refining or fibrillation and shortening of the fibers can be done by conical and disc type refiners, grinders, homogenizers, super mass colliders, etc.

This disclosure allows a more standard product to be produced through refining which is then processed using a dynamic washer (such as that disclosed in Gero et al. U.S. Pat. No. 5,538,632, issued 23 Jul. 1996, incorporated herein by reference), or other fine fractionation device to remove the objectionable longer fiber from the NFC slurry. Testing has confirmed that this provides an excellent quality product, while reducing the amount of refining energy by 19% to 24% over that would be required when using refining alone. It is expected that additional testing and optimization will result in gross energy savings over 30%. Comparative testing has shown that the CNF produced utilizing this process has equal or in some cases, superior properties to that produced in a typical system using only refining to produce CNF, thus demonstrating the effectiveness of this process.

This disclosure also allows development of a simple continuously operating system by reducing the number of refining stages thereby significantly reducing the energy applied and refining time required in the fibrillation and CNF development refining process.

DRAWINGS

Figure 1:
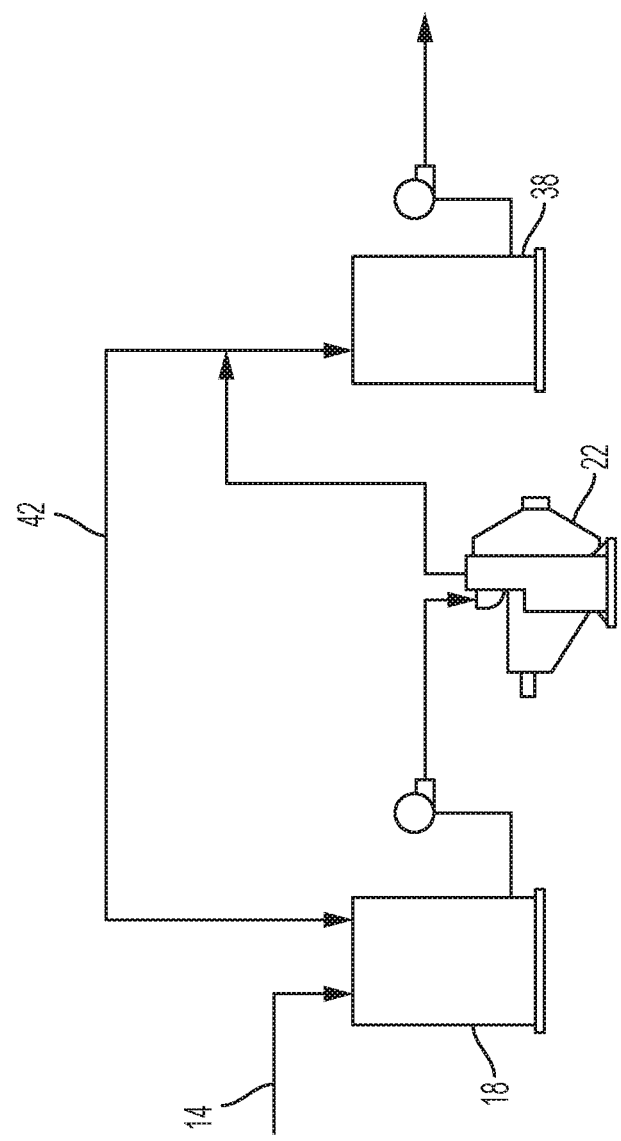
FIG. 1 is a single stage conventional batch CNF system with a production capacity of approximately 1 to 2 tons per day.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

PREFERRED EMBODIMENTS

Disclosed is a cellulose nanofibrils production method 10 comprising the steps of: identifying a desired level of cellulose nanofibrils pulp purity, partially refining pulp to produce a cellulose nanofibrils pulp purity between 5% and 20% less than the desired desired purity, and then separating out the cellulose nanofibrils from the longer fibers to produce the desired level of cellulose nanofibrils pulp purity. For example, if a desired level, for a particular product, of cellulose nanofibrils pulp purity is 80.5%, then pulp could be refined to 18% less than the desire purity, or to a level of 66.3%. The pulp would then be screened to get to 80.5% level of cellulose nanofibrils pulp purity. This results in a savings of 513.46 kWh/ton, over refining alone to get the pulp to the 80.5% purity level (see FIG. 4).

The disclosed process 10 processes pulp with a relatively lower CNF level by way of a device 34 which is capable of filtering out longer fibers, thereby leaving the processed pulp with increased CNF purity, and minimized "long fiber" present. This device 34 can be but is not limited to the dynamic washer referenced above, or a commercial product such as the GL&V Dynamic Washer, GL&V Liquor Filter, or some similar device, that is capable of filtering out the longer fiber present in the pulp. This is accomplished by use of a perforated or slotted screening plate utilizing very fine slots or perforations, smooth or "profiled" with a rotating pulsation generator running in close proximity to the perforated screening plate. A typical perforation size would be (but not limited to) 0.006" (0.15 mm) diameter or 0.004" (0.10 mm) diameter holes. It is expected that the smaller perforations will result in a purer CNF with a higher fines content than a process utilizing larger perforations.

The action of the pulsation generator is sufficient to generate pulsations capable of causing semi-fluidization of the incoming pulp slurry. The finest of the fiber elements present (CNF) are allowed to pass through the fine perforations in the screen basket while the longer fibers present become entangled and are retained in the feed side of the screen plate. The filtered fine fiber elements (CNF) that pass through the screen cylinder are allowed to discharge out of the device and are passed on in the process for use in various applications. The retained longer fibers are collected in a reject area and are discharged from the filtering device to be sent back in the system to join with un-processed materials being fed to the refining device for further processing. In the alternative, the retained longer fibers can also be used as is in other systems in a mill "as is", or disposed of.

Figures 4, 5:
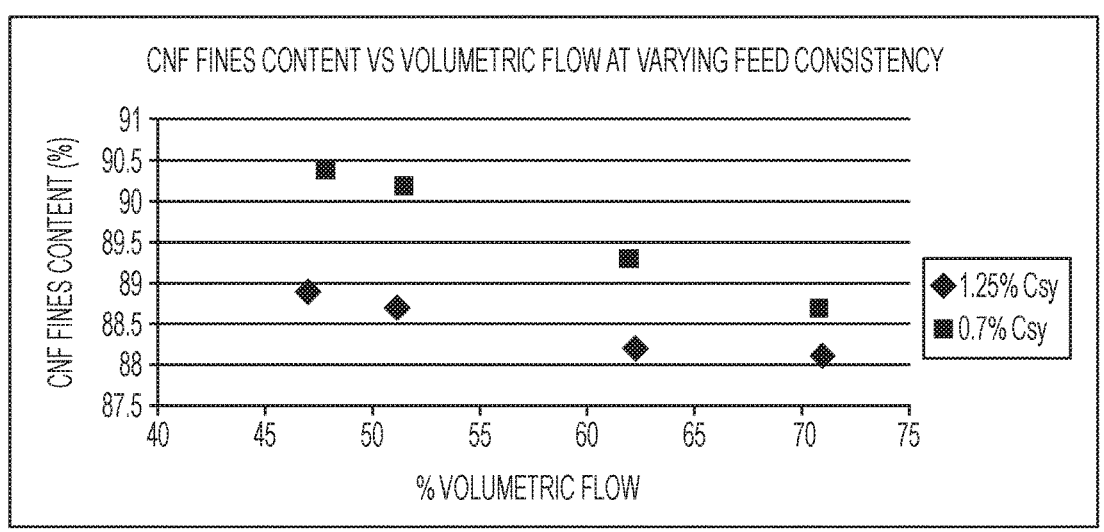
FIG. 4 shows the effect of varying the stopping point for refining and the resulting fines content of the CNF after the purification process. These results are all using a 1.0% feed consistency.
FIG. 5 shows the effect of feed consistency to the purification process on the purity of the CNF being produced.

The processed CNF pulp has a much narrower fiber length distribution than the refiner discharge alone, and thus is purer than the material this not treated in such a way. Preliminary testing has produced 6% to 14% increase in fines content by utilization of this process. Fines measurement is carried out using the Technidyne Morfi Fiber length Analyzer, but a similar device from another manufacturer could be utilized for this testing. Additionally, varying the feed consistency to the Dynamic Washer results in greater or lesser purification of the CNF from this device. More particularly, a reduction in feed consistency results in higher fines in the CNF stream. Conversely, increasing the feed consistency reduces the fines of the CNF stream, as seen in FIG. 5.

Figure 2:
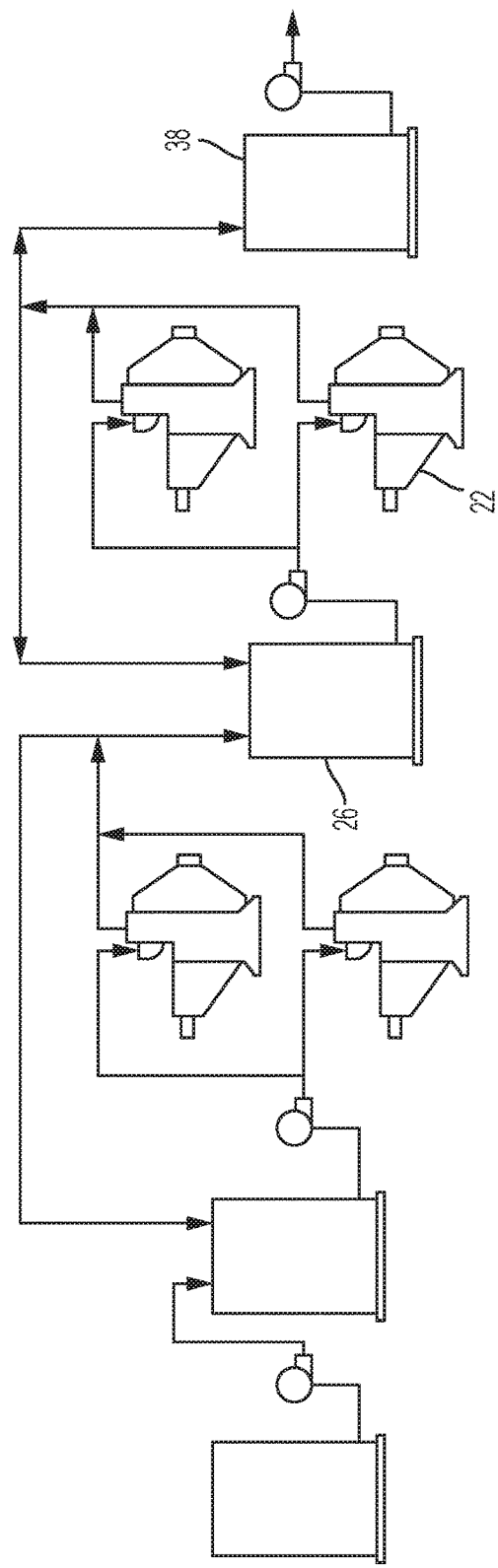
FIG. 2 is a multistage conventional batch CNF system utilizing multiple refiners to result in a production capacity of approximately 10 to 20 tons per day.

The component parts for a conventional refining system, to generate CNF, consists of a source of raw material, slushed pulp which is discharged into an agitated refiner feed tank 18 with a refiner system feed pump, with its suction connection attached to tanks (FIG. 1). A two-stage refiner system comprises of one or more refiners 22 connected in series or parallel or some combination of both, with the refining system discharge connected back to the refiner feed or forward to CNF storage, as shown in FIG. 2. There may be a need for intermediate CNF storage 26 between the refining stages in FIG. 2.

Figure 3:
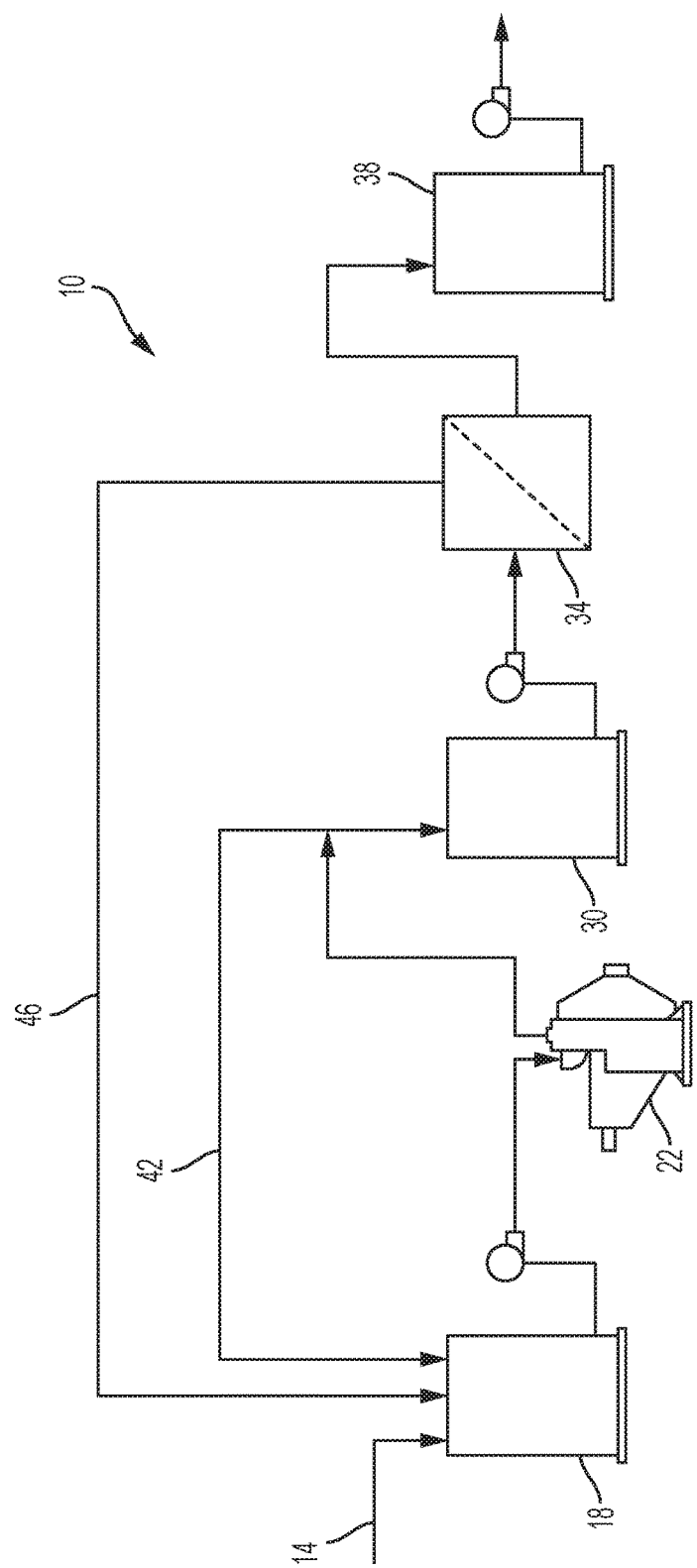
FIG. 3 is the improved continuous CNF system of this disclosure.

The improved refining system of this disclosure is illustrated in FIG. 3. The added CNF purification stage consists of a purification stage feed pump connected with its suction connected to the previously mentioned CNF storage tank 30. The pump discharge is connected to the feed connection of a purification device, such as the GL&V Dynamic Washer. The discharge of the purification device consists of two ports on the device, one of which contains the purified CNF which then is discharged to a "Purified CNF" storage 38 for transfer to its final use or addition point to the paper making process or other such application.

The second discharge port on the purification device is the separated longer fiber component of the feed stock. This port is connected and returned 46 to the refiner feed chest for mixing with incoming raw material and reprocessing in the refining system (FIG. 3). The addition of a thickening stage for the separated long fiber may be useful or advantageous at this point in the system before being blended with the un-refined raw feedstock. This purification process could be run as either a continuous or batch process with the purification device being run either continuously or intermittently in a batch mode. The preferred embodiment would be to run as a continuous process.

FIG. 4 shows the results of purification testing starting with differing inlet fines level resulting in differing accept fines energy reductions and energy savings. Feed consistency is 1.0% (measured by the mass of dry pulp divided by the mass of the pulp slurry) for all points.

FIG. 5 shows the effect of feed consistency to the Purifier (Dynamic Washer) on the fines content (Purity) of the resulting CNF. The lower feed consistency (in this case 0.7% consistency compared to the higher 1.25% feed consistency) to the Purifier results in higher fines content in the purified CNF ("Y" axis). This is true for the entire range of CNF flow tested. This also shows that the lower volumetric flow as a percentage of total feed to the Purifier does result in a purer CNF (higher fines content).

An alternate embodiment of the process would be to separate the long fiber from the CNF and process it in a satellite or side stream system. This would consist of the addition of an agitated tank to collect the long fiber stream from the purification device for additional processing in a separate refining system similar to the one previously described. This additional refining system may be operated in the same fashion as the primary system. The final discharge from the system would be taken to the feed tank 18 of the CNF purification device could be combined with the discharge of the mainstream refining system and additional processing.

An additional alternate embodiment of this process would be to separate the long fiber from the CNF process and add it to the paper machine pulp system, thereby adding refined fiber to the main stream fiber source for paper manufacturing and also effectively reducing the required refiner power in that area of the system.

The advantages of this process are a significant reduction of applied power to the pulp being processed over that of a system that utilizes refiners alone to reach the targeted high fines level of 80% or greater. A second advantage of this process is reduced refiner plate wear and longer filling life due to the reduction of the length of time that the refiners are run while processing the extremely short fiber length associated with the targeted high fines levels. The refining time required to increase the fines content from 80% to 90% can be significant depending on the batch time and the energy level that the pulp will support. This process also provides the opportunity to reduce the amount of required equipment thereby also contributing to a reduction of the total system power requirement and cost to reach the targeted CNF quality level. Both the refining time and reduced energy usage will be dependent upon the system capacity and production rate. Total gross energy savings of 19% to 24% have been seen in testing of this process.

Various other features of this disclosure are set forth in the following claims.

The invention claimed is:

1. A cellulose nanofibrils production method comprising the steps of: identifying a desired level of cellulose nanofibrils pulp purity, purity being defined by a number of fibers under a desired length of fiber compared to the total number of fibers, partially refining pulp to produce a cellulose nanofibrils pulp purity between 5% and 20% less than the desired level of cellulose nanofibrils pulp purity, and then separating out the cellulose nanofibrils under the desire length of a fiber from the longer fibers to produce the desired level of cellulose nanofibrils pulp purity.

2. A cellulose nanofibrils production method according to claim 1 wherein the cellulose nanofibrils are separated from the longer fibers by a screening plate.

3. A cellulose nanofibrils production method according to claim 1 wherein the pulp to be refuted has a feed consistency of no greater than 1.25%.

4. A cellulose nanofibrils production method according to claim 3 wherein the pulp to be refined has a feed consistency of less than 1%.

* * * * *